W. H. RITCHIE.
BICYCLE FLASH LIGHT BRACKET.
APPLICATION FILED MAY 26, 1917.
1,277,479.                                    Patented Sept. 3, 1918.
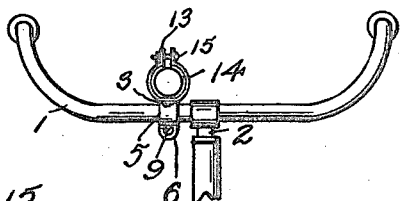
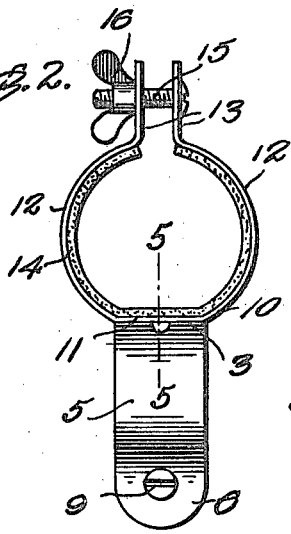
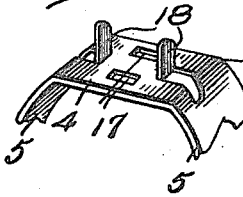
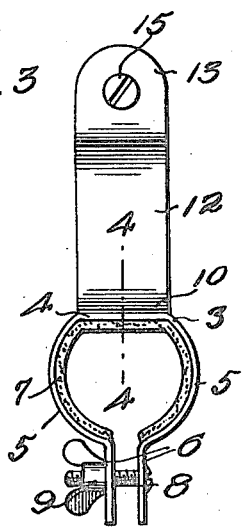
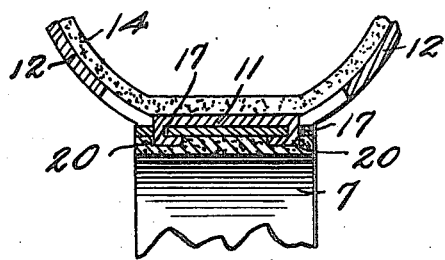
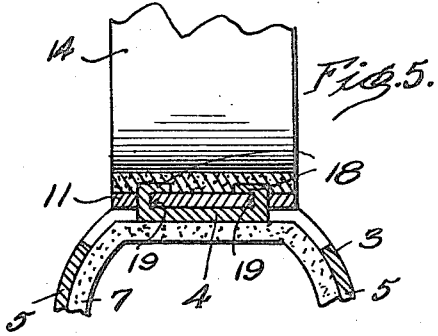
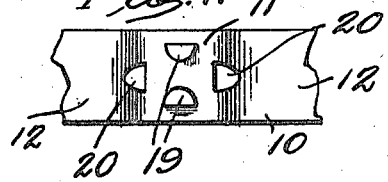
Inventor
W. H. Ritchie
his Attorneys

UNITED STATES PATENT OFFICE.

WILLIAM HERMAN RITCHIE, OF PATCHOGUE, NEW YORK.

BICYCLE FLASH-LIGHT BRACKET.

1,277,479. Specification of Letters Patent. Patented Sept. 3, 1918.

Application filed May 26, 1917. Serial No. 171,176.

*To all whom it may concern:*

Be it known that I, WILLIAM H. RITCHIE, citizen of the United States of America, residing at Patchogue, in the county of Suffolk and State of New York, have invented certain new and useful Improvements in Bicycle Flash-Light Brackets, of which the following is a specification, reference being had therein to the accompanying drawing.

This invention relates to a bicycle flash light bracket and has for its principal object the production of an efficient means for retaining the flash light on the handle bar.

Another object of this invention is the production of a bicycle flash light bracket wherein a pair of sleeves are fixedly secured together and turned at right angles to each other thereby allowing one bracket to grip the handle bar while the remaining bracket may secure a flash light in such a manner as to cause the flash light to project rays of light directly in front of the bicycle.

A still further object of this invention is the production of a bicycle flash light bracket wherein lips are struck from each sleeve and are bent into permanent engagement with each other thereby holding the bracket in an assembled condition.

With these and other objects in view this invention consists of certain novel combinations, constructions, and arrangements of parts as will be hereinafter fully described and claimed.

In the accompanying drawings:

Figure 1 is a front elevation of the flash light bracket in use.

Fig. 2 is an enlarged front elevation of the bracket.

Fig. 3 is an enlarged side elevation of the bracket.

Fig. 4 is an enlarged fragmentary section taken on the line 4—4 of Fig. 3.

Fig. 5 is an enlarged fragmentary vertical section through a portion of the bracket taken at right angles to Fig. 4 on the line 5—5 of Fig. 2.

Fig. 6 is a fragmentary perspective view of the upper portion of the bar engaging sleeve.

Fig. 7 is a bottom plan view of the flash light carrying sleeve.

Referring to the accompanying drawings by numerals it will be seen that this flash light bracket is adapted to be secured to the handle bar 1 of the usual steering post 2 whereby the flash light carried by the bracket will project rays of light directly along the path of the bicycle, owing to the fact that the handle bar is turned from side to side the light will be turned so as to project the light rays in the manner specified.

The bar engaging sleeve 3 has a substantially horizontal or flat top portion 4 from which extend sides 5 in depending relation which sides 5 terminate in the substantially parallel ears 6.

It is, of course, obvious that this sleeve may carry a felt strip 7 or any other soft strip so that when the sleeve 3 is positioned upon the handle bar the felt will prevent the sleeve from scarring the same. The bolt 8 is then passed through the ears 6 so as to permit the butterfly nut 9 to be secured onto the projecting end of the bolt 8 for drawing the ears 6 toward each other and thereby cause the sleeve 3 to grip the handle bar 1 as shown in Fig. 1.

The flash light carrying sleeve 10 has a comparatively flat base 11 which is adapted to fit snugly upon the flat portion 4 of the sleeve 3 as shown in Figs. 1 to 5 inclusive. The upwardly extending bowed sides 12 extend from the flat base 11 and terminate in the vertical parallel ears 13. This sleeve 10 is provided with a felt strip 14 so that when the flash light is positioned within the sleeve the strip 14 will protect the light from injury. The bolt 15 is then passed through the ears 13 so as to permit the butterfly nut 16 to be positioned on the projecting end of the bolt 15 for drawing the ears toward each other and thus causing the bowed sides 12 of the sleeve 10 to grip the flash light for holding the same from accidental displacement.

In order to permanently secure the sleeves upon each other the bar engaging sleeve is provided with a pair of alined elongated openings 17 as shown clearly in Fig. 6. The alined lips 18 are also struck from the flat top 4 of the sleeve 3 adjacent each end of this flat top while the openings 17 before referred to are formed adjacent to the side 6 of this top. The flat base 11 of the sleeve 10 is provided with openings 10 adjacent its sides while tongues 20 are struck from the flat base 11 adjacent its ends and are bent downwardly as shown in Fig. 4. When these sleeves are turned so as to extend at right angles to each other as shown in Figs. 1 to 5 inclusive. Because of this arrangement the lips 18 of the sleeve 3 are passed through the openings 19 of the base 11 of the flash light carrying sleeve 10 as shown clearly in Fig. 5. At this time the lips 18 are bent downwardly adjacent their projecting ends so as to cause these projecting ends to grip very firmly the flat base 11 of the flash light carrying sleeve 10. The depending tongues 20 of the flat base 11 of the flash light carrying sleeve 10 are then passed through the openings 17 of the flat top 4 of the bar gripping sleeve 3 after which the projecting ends of the tongues 20 are clamped so as to overhang and grip the inner surface of the flat top 4 as shown in Fig. 4. Thus it will be seen that the lips of the bar gripping sleeve will grip the flash light carrying sleeve while the tongues of the flash light carrying sleeve will grip the bar gripping sleeve and in this manner these two sleeves will be positively held in fixed engagement with each other at all times.

From the foregoing description it will be seen that a very simple and efficient flash light bracket has been produced whereby one sleeve will positively grip the handle bar while the remaining sleeve extending at right angles to the first mentioned sleeve will positively carry a flash light so as to cause the rays of light to be projected directly in front of the bicycle. It will further be seen that the construction of the lips and tongues is such as to cause the sleeves to be fixedly held in engagement with each other and that by clamping the lips and tongues as shown clearly in Figs. 4 and 5 a substantially even surface is presented when the felt strips are positioned within the sleeves.

What is claimed is:

As a new article of manufacture, a flash light bracket comprising a bar engaging sleeve and a flash light carrying sleeve, each sleeve positioned at right angles to the other sleeve and having a flat horizontal portion, bowed sides extending from said flat horizontal portions and terminating in parallel ears, means for drawing said ears toward each other for contracting said sleeves, each of said horizontal portions being provided with a pair of parallel elongated apertures and with a pair of parallel elongated lips, the lips of one of said horizontal portions extending through the apertures of the other horizontal portion, and the lips of both horizontal portions being bent at the outer ends parallel to said horizontal portions, for securing said sleeves securely together, and padding means carried upon said sleeves, substantially as shown and described.

In testimony whereof I hereunto affix my signature.

WILLIAM HERMAN RITCHIE.